(12) United States Patent
Koukol et al.

(10) Patent No.: US 9,165,366 B2
(45) Date of Patent: Oct. 20, 2015

(54) SYSTEM AND METHOD FOR DETECTING AND DISPLAYING AIRPORT APPROACH LIGHTS

(75) Inventors: Ondrej Koukol, Prague (CZ); Tomas Beda, Prague (CZ); Jan Lukas, Melnik (CZ); Ondrej Pokorny, Merin (CZ)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 663 days.

(21) Appl. No.: 13/353,386

(22) Filed: Jan. 19, 2012

(65) Prior Publication Data

US 2013/0188049 A1 Jul. 25, 2013

(51) Int. Cl.
*G08G 5/00* (2006.01)
*G06T 7/00* (2006.01)
*G08G 5/02* (2006.01)

(52) U.S. Cl.
CPC .......... *G06T 7/0044* (2013.01); *G08G 5/0021* (2013.01); *G08G 5/025* (2013.01); *G06T 2207/10016* (2013.01); *G06T 2207/10048* (2013.01); *G06T 2207/30248* (2013.01)

(58) Field of Classification Search
CPC ...... G01C 11/025; G01C 11/02; H04N 7/005; H04N 7/18; H04N 7/181
USPC ........................................................ 348/144
See application file for complete search history.

(56) References Cited

U.S. PATENT DOCUMENTS

| | | | |
|---|---|---|---|
| 3,651,582 A | 3/1972 | Lavarenne | |
| 5,677,685 A | 10/1997 | Coirier et al. | |
| 5,719,567 A | 2/1998 | Norris | |
| 5,745,863 A | 4/1998 | Uhlenhop et al. | |
| 6,061,068 A | 5/2000 | Hoffman, II et al. | |
| 6,157,876 A | 12/2000 | Tarleton, Jr. et al. | |
| 6,311,108 B1 | 10/2001 | Ammar et al. | |
| 6,952,632 B2 | 10/2005 | Robert et al. | |
| 7,113,202 B2 | 9/2006 | Konya | |
| 7,196,329 B1 | 3/2007 | Wood et al. | |
| 7,209,053 B2 | 4/2007 | Gannon | |
| 7,216,069 B2 | 5/2007 | Hett | |
| 7,364,121 B2 | 4/2008 | Firuz et al. | |
| 7,605,719 B1 | 10/2009 | Wenger et al. | |
| 7,605,774 B1 | 10/2009 | Brandt et al. | |
| 7,702,461 B2 | 4/2010 | Conner et al. | |
| 7,719,483 B2 | 5/2010 | Feyereisen et al. | |
| 7,881,833 B2 | 2/2011 | Turung | |
| 7,965,202 B1 | 6/2011 | Chiew et al. | |
| 7,965,223 B1 | 6/2011 | McCusker | |
| 7,983,838 B1 | 7/2011 | Mislan | |
| 8,019,529 B1 | 9/2011 | Sharma et al. | |

(Continued)

OTHER PUBLICATIONS

EP Office Action for Application No. 13 150 715.4 dated May 24, 2013.

(Continued)

*Primary Examiner* — Richard Torrente
*Assistant Examiner* — Frank Huang
(74) *Attorney, Agent, or Firm* — Ingrassia Fisher & Lorenz, P.C.

(57) ABSTRACT

A vehicle display system displays approach lights acquired by a vision system overlaid on, and aligned with, a stored synthetic approach light symbol. A stored approach light type that corresponds to the target runway may be verified to match the acquired approach lights. A synthetic approach light symbol that corresponds to the approach light type is chosen and aligned with the approach lights for display.

15 Claims, 8 Drawing Sheets

(56) References Cited

U.S. PATENT DOCUMENTS

| | | |
|---|---|---|
| 2004/0167685 A1 | 8/2004 | Ryan et al. |
| 2005/0232512 A1* | 10/2005 | Luk et al. ............... 382/276 |
| 2006/0066459 A1 | 3/2006 | Burch et al. |
| 2007/0106433 A1 | 5/2007 | He |
| 2007/0241936 A1 | 10/2007 | Arthur et al. |
| 2008/0180351 A1 | 7/2008 | He |
| 2008/0240498 A1 | 10/2008 | Hamza |
| 2009/0018713 A1 | 1/2009 | Coulmeau et al. |
| 2009/0214080 A1 | 8/2009 | Hamza et al. |
| 2009/0303082 A1 | 12/2009 | Larson et al. |
| 2010/0026525 A1 | 2/2010 | Feyereisen et al. |
| 2010/0039294 A1 | 2/2010 | Feyereisen et al. |
| 2010/0106356 A1 | 4/2010 | Trepagnier et al. |
| 2010/0207026 A1 | 8/2010 | Kerr |
| 2010/0250030 A1 | 9/2010 | Nichols et al. |
| 2011/0063445 A1 | 3/2011 | Chew |
| 2011/0106343 A1 | 5/2011 | Burgin et al. |

OTHER PUBLICATIONS

Korn B., et al: "Enhanced and synthetic vision: increasing pilot's situation awareness under adverse weather conditions" 21th Digital Avionics Systems Conference Proceedings. Irvine, CA, Oct. 27-31, 2002; New York, NY; IEEE, US, vol. 2, Oct. 27, 2002, pp. 645-654, XP010616241, ISBN: 978-0-7803-7367-9.

Bailey, R., et al. "Crew and Display Concepts for Synthetic / Enhanced Vision Systems" SPIE vol. 6226, Apr. 17, 2006, XP040224709, Orlando, FL.

Kramer, L., et al.: "Synthetic vision systems—operational considerations simulation experiment", SPIE, vol. 6559, Apr. 9, 2007, pp. 1-16, XP040240099, Orlando, FL.

EP Search Report for Application No. 13 150 715.4 dated May 8, 2013.

EP Examination Report for Application No. 13150715.4 dated Nov. 14, 2014.

\* cited by examiner

SYSTEM AND METHOD FOR DETECTING AND DISPLAYING AIRPORT APPROACH LIGHTS

TECHNICAL FIELD

The exemplary embodiments described herein generally relate to display systems and more particularly to a display system and method for the display of aircraft landing approach lights.

BACKGROUND

It is important for pilots to understand the landing environment when approaching a runway for landing. Approach lights are an important part of this landing environment. Typically, a pilot will see, or recognize, the approach lights well before seeing the runway, especially in limited visibility of night and/or weather, or at unfamiliar airports. Approach lights include many types that vary in length, width, and design. A decrease in pilot workload in gaining this recognition of the approach environment typically results in increased safety: when the information provided on the screen is easily interpreted, freeing more of the pilot's thought processes when he may have many other decisions to make.

Many vehicles, such as aircraft, are commonly equipped with one or more vision enhancing systems to convey flight path and/or flight management information. Such vision enhancing systems are designed and configured to assist a pilot when flying in conditions that diminish the pilot's view from the cockpit, such as, but not limited to, darkness and weather phenomenon. One example of a vision enhancing system is known as a synthetic vision system (hereinafter, "SVS"), which may be more generally described as a being a dynamic condition subsystem of the aircraft. An example of a synthetic vision system is disclosed in U.S. Pat. No. 7,352,292. Additionally, an exemplary synthetic vision system is available for sale under product name SmartView, manufactured by Honeywell International, Inc.

A typical SVS is configured to work in conjunction with a position determining unit associated with the aircraft as well as with dynamic sensors that sense the aircraft's altitude, heading, and attitude. The SVS typically includes a database containing information relating to the topography along the aircraft's flight path. The SVS receives inputs from the position determining unit indicative of the aircraft's location and also receives inputs from the dynamic sensors on board the aircraft indicative of the aircraft's heading, altitude, and attitude. The SVS is configured to utilize the position, heading, altitude, and orientation information and the topographical information contained in its database, and generate a three-dimensional image that shows the topographical environment through which the aircraft is flying from the perspective of a person sitting in the cockpit of the aircraft. The three-dimensional image may be displayed to the pilot on any suitable display unit accessible to the pilot. Using an SVS, the pilot can look at the display screen to gain an understanding of the three-dimensional topographical environment through which the aircraft is flying and can also see what lies ahead. One advantage of the SVS is that its image is clean and is not obstructed by any weather phenomenon.

Thus, SVS images can provide the vehicle operator with an effective interface for vehicle control. SVS image integrity, however, is limited by the integrity of the information pre-stored in the database. Accordingly, incomplete and/or outdated database information can result in SVS images of limited value.

Another example of a vision enhancing system is known as an enhanced vision system (hereinafter, "EVS"), which may be more generally described as being a sensor subsystem. Examples of enhanced vision systems are disclosed in U.S. Pat. Nos. 7,655,908 and 5,317,394. Additionally, an exemplary enhanced vision system is available for sale in the market place under product name EVS-II, manufactured by Kollsman, Inc. A typical EVS includes an imaging device, such as, but not limited to, a visible lowlight television camera, an infrared camera, or any other suitable light detection system capable of detecting light or electromagnetic radiation, either within or outside of the visible light spectrum. Such imaging devices are mounted to the aircraft and oriented to detect light transmissions originating from an area outside of the aircraft and are typically located ahead of the aircraft in the aircraft's flight path. The light received by the EVS is used by the EVS to form an image that is then displayed to the pilot on any suitable display in the cockpit of the aircraft. The sensor used in an EVS can typically see what a human eye cannot, which might be caused by sensitivity to other part of spectra than visible light, or greater sensitivity to visible light than the typical human eye has. Accordingly, using the EVS, a pilot can view elements of the topography that are not visible to the human eye. For this reason, an EVS is very helpful to a pilot when attempting to land an aircraft in inclement weather or at night. One advantage to the EVS system is that it depicts what is actually present versus depicting what is recorded in a database. Although some image processing is commonly used and it can improve image quality, the images presented to the vehicle operator still may not be optimal for pilot workload.

Some display systems display both an SVS image and an EVS image display. For example, an EVS image is displayed that is augmented by an SVS image of terrain surrounding the EVS image; such terrain being out of the field of view of the EVS sensor.

Accordingly, it is desirable to provide an apparatus and method for displaying approach lighting that is readily discernable by the pilot while reducing the pilot's workload. Furthermore, other desirable features and characteristics of exemplary embodiments will become apparent from the subsequent detailed description and the appended claims, taken in conjunction with the accompanying drawings and the foregoing technical field and background.

BRIEF SUMMARY

Systems and methods for providing enhanced views of approach lighting for a landing environment are provided.

In a first exemplary embodiment, the system includes an electronic sensor configured to acquire an enhanced image including approach lights; and a processor coupled to the sensor and configured to detect approach lights in the image and determine their position within the image.

The system in a second exemplary embodiment includes a vision system configured to acquire an image including approach lights; a database configured to provide a plurality of approach lights images, and a plurality of synthetic approach light symbols, each corresponding to one of the approach light images; a display; and a processor coupled to the vision system, the database, and the display, and configured to detect the approach lights from the enhanced vision images and store their position in memory; identify one of the approach light types that corresponds to the runway selected for landing; verify that the identified approach light type matches the detected approach lights; choose one of the synthetic approach light symbols that corresponds to the identified approach light type; align the synthetic approach light symbol with the approach lights; determine an approach lights vector from the approach lights; obtain a landing environment centerline vector and approach lights position from the database; calculate a deviation of the landing environment centerline vector and expected approach lights position from the approach lights vector and detected approach lights position; correct the landing environment centerline vector and expected approach lights position in the database according to the detected deviation; correct all applicable databases according to the detected deviation; and display the enhanced vision image including the approach lights aligned with the synthetic approach light symbol.

An exemplary method of displaying images to an aircrew member of an aircraft includes acquiring enhanced images including approach lights; detecting the approach lights within the image; and storing the position of the approach lights.

BRIEF DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any theory presented in the preceding technical field, background, brief summary, or the following detailed description.

Improved systems and methods for displaying landing approach lights to a pilot of an aircraft during the approach are disclosed. Generally, the system is configured to display a synthetic symbol representative of detected approach lights onto an image of the approach lights.

More specifically, an image of the landing environment including approach lights and the runway (if visible) are acquired and marked and the image optionally may be improved by image enhancing software. A detection is made of the approach lights shape and optionally, a comparison is made with approach light types stored in a database. A synthetic approach light symbol is identified that corresponds to the approach light type. In one embodiment, only one general synthetic symbol is used for all approach light types. In other embodiments, each approach light type will have assigned a specific synthetic symbol. In other embodiments, several approach light types might share one common synthetic symbol, for example, all simple approach lighting systems would share a symbol and all Cat I approach lighting systems would share another symbol. An approach lights vector and position are determined from the identified approach lights and a landing environment centerline vector and approach lights position is obtained from the database. The approach light symbol is over laid onto the approach light image and a deviation of the landing environment centerline vector from the approach lights vector is calculated. The synthetic approach light symbol is realigned with the identified approach lights in consideration of the calculated deviation, and then displayed.

Although embodiments described herein are specific to aircraft display systems, it should be recognized that principles of the inventive subject matter may be applied to other display systems, such as those in helicopters, or space vehicles, such as space shuttles.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), vector processor, stream processor, specialized graphical processor used for general computations (GPGPU), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, video memory (VRAM, DRAM), video card memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The following detailed description is merely exemplary in nature and is not intended to limit application and uses. Furthermore, there is no intention to be bound by any theory presented in the preceding background or the following detailed description.

Figure 1:
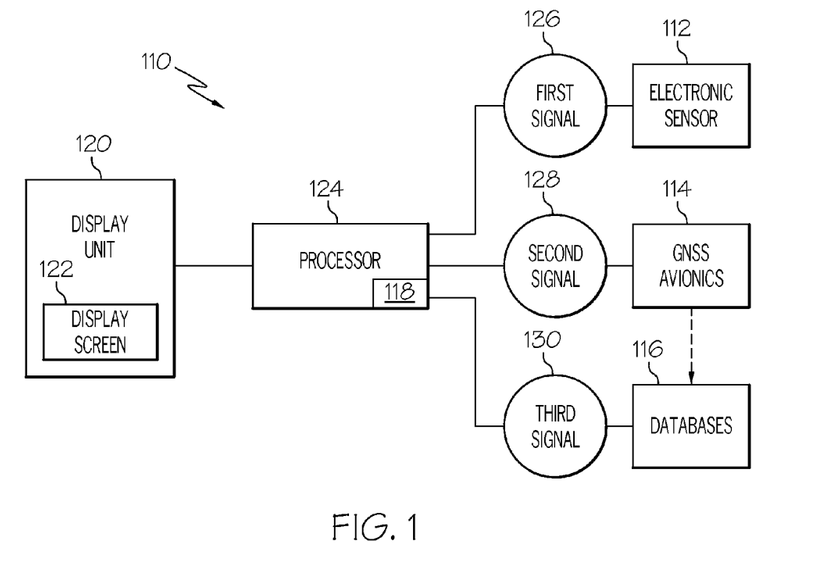
FIG. 1 is a block diagram of a vehicle display system for generating images in accordance with an exemplary embodiment.

FIG. 1 is a simplified functional block diagram illustrating a system 110 for displaying multiple overlaid images to a pilot of an aircraft during flight. System 110 includes multiple components each of which may be configured for mounting to aircraft. In some embodiments, system 110 may be a self-contained system such that each of the components described below are contained in a single housing and are dedicated exclusively to serving the functions of system 110, while in other embodiments, the various components described below may be standalone components or they maybe components that are used as part of other systems and which are configured to be used as a shared resource between such other systems and system 110.

In the embodiment illustrated in FIG. 1, system 110 includes an electronic sensor 112, a Global Navigation Satellite System (GNSS) and avionics sensors 114, databases 116, an image decisioner 118, a display unit 120, a display screen 122, and a processor 124. Databases 116 need not be present, especially in unmanned aerial systems (UAS) applications, where no display is typically used. In case of a pilot-operated aircraft when a display is used, the databases 116 always include a synthetic symbol database (SSD). Optionally, other databases such as a terrain database to support a synthetic vision system (SVS) may be included as well. In equivalent embodiments, system 110 may include either additional or fewer components. In a simple embodiment, the system 110 includes only the electronic sensor 112 and processor 124.

In some embodiments, the system 110 may operate fully or partially integrated into an Enhanced Vision System (EVS) or a Combined Vision System (CVS) when EVS is used together with the terrain database and the runway database.

The electronic sensor 112 includes one or more sensors, typically adapted for mounting to an aircraft, and configured to detect a light signature originating from outside the aircraft. The sensor may include a visible low light television camera, an infrared camera, a millimeter wave (MMW) camera, or any other light sensing device capable of detecting light either within or outside of the visible spectrum. In some embodiments, the sensor may include an active (emitting) sensor, such as radar, for example, but not limited to, millimeter wave (MMW) radar, and light detection and ranging (LiDAR) radar. The light signature may include any light that is projected from, or that is reflected off of any terrain or object outside of the aircraft. In one application, the light signature includes, but is not limited to, signature components from lights that are positioned adjacent to a runway and which are pointed to facilitate approach runway position and bearing identification.

The electronic sensor 112 is configured to generate a first signal 126 and to provide the first signal 126 to processor 124. The first signal 126 is an electronic signal that includes information corresponding to the light signature detected by the sensor 112 and which would enable processor 124 to render an image of the light signature (referred to hereinafter as "the EVS image"). For example, if the detected light signature includes components of a distant runway and runway approach lights adjacent to the runway, first signal 126 would enable processor 124 to render an image of the distant runway and the adjacent runway approach lights. In some embodiments, the electronic sensor 112 may include a dedicated processor, a microprocessor, circuitry, or some other processing component that is configured to receive input from the one or more light detecting sensors and to generate first signal 126 using such inputs. In other embodiments, the electronic sensor 112 may not include a dedicated processor, microprocessor, circuitry or other processing component, in which case the first signal 126 would comprise an unprocessed sensor for processing by processor(s) 124.

When used, the databases 116 always includes a symbol database, where synthetic symbols assigned to the approach lighting system are stored. In some embodiments this can be stored just in the memory of the processor 124 and only a single symbol might be stored. In other embodiments, an external database might be used. Typically, the databases 116 would include; for example, a navigation database where runway locations would be stored, or a runway database which may include, for example, information about runway width and type of approach lighting system used.

When the system 110 is a Combined Vision System (CVS), the database 116 includes a terrain database. The terrain database is configured to generate a three-dimensional image of the topographical environment of the approach to an airport (referred to hereinafter as "synthetic image") and generate a third signal 130 carrying the synthetic image and to provide the third signal 130 to processor 124. The terrain database may include a data storage device (not shown) containing a data base with data relating to the topography environment, which may represent either or both landscape and/or man-made structures, including approach lights, located along the aircraft's flight path. In some embodiments, the data storage device may contain such data for an entire geographical region such as a state, a country or continent. The terrain database may also access or include a position determining unit that is configured to determine the position of the aircraft with respect to the surface of the earth. Such a position determining unit may include, for example but not limited to, a GNSS system or an inertial navigation system. The terrain database may be configured to receive course, speed and other avionics inputs relating to the aircraft's heading, altitude and attitude. In equivalent embodiments, the terrain database may receive the GNSS and avionics inputs from the aircraft's GNSS and avionics sensors 114.

In some embodiments, the terrain database may include a dedicated processor, microprocessor, or other circuitry that is configured to take the information pertaining to the position, attitude, altitude and heading of the aircraft and to utilize the information available in the database to generate the third signal 130 that may be utilized by processor 124 to render a three-dimensional image of the topographical environment, including approach lights for a runway to which the aircraft is approaching. In other embodiments, the terrain database may not include a dedicated processor, microprocessor or other circuitry. In such embodiments, the third signal 130 would include the unprocessed sensor information and location data which could then be utilized by processor 124 to render the three dimensional image of the synthetic image. In either event, the terrain database is configured to provide third signal 130 to processor 124.

The display 120 is configured to provide the enhanced images to the operator. In accordance with an exemplary embodiment, the display 120 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 120 additionally may be implemented as a panel mounted display, a HUD (head-up display) projection, or any one of numerous known technologies. It is additionally noted that the display 120 may be configured as any one of numerous types of aircraft flight deck displays. For example, it may be configured as a multi-function display, a horizontal situation indicator, or a vertical situation indicator. In the depicted embodiment, however, the display 120 is configured as a primary flight display (PFD).

Additionally, display unit 120 includes a display screen 122 that is operatively connected to display unit 120. Display screen 122 is configured to be controlled by display unit 120 and may be used to display any type of image including, but not limited to, graphics and text. In some embodiments, display unit 120 may include multiple display screens 122 and/or system 110 may include multiple display units 120.

Processor 124 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 124 may comprise a single processor or a plurality of processors acting in concert. In some embodiments, processor 124 may be dedicated for use exclusively with system 110 while in other embodiments processor 124 may be shared with other systems on board the aircraft. In still other embodiments, processor 124 may be integrated into any of the other components of system 110. For example, in some embodiments, processor 124 may be coupled with the sensor 112.

Processor 124 is communicatively coupled to the sensor 112, GNSS/avionics sensors 114, and databases 116, and is operatively coupled to display unit 120. Such communicative and operative connections may be effected through the use of any suitable means of transmission, including both wired and wireless connections. For example, each component may be physically connected to processor 124 via a coaxial cable or via any other type of wired connection effective to convey electronic signals. In other embodiments, each component may be communicatively connected to processor 124 across a bus or other similar communication corridor. Examples of suitable wireless connections include, but are not limited to, a Bluetooth connection, a Wi-Fi connection, an infrared connection, OneWireless™ connection, or the like. The OneWireless™ connection has been developed by Honeywell International, Inc., the Assignee of this document.

Being communicatively and/or operatively coupled with the electronic sensor 112, GNSS/avionics sensors 114, databases 116, and display unit 120 provide processor 124 with a pathway for the receipt and transmission of signals, commands, instructions, and interrogations to and from each of the other components. Processor 124 is configured (i.e., loaded with and being capable of executing suitable computer code, software and/or applications) to interact with and to coordinate with each of the other components of system 110 for the purpose of overlaying images corresponding to the first signal 126 and the third signal 130. For example, in the illustrated embodiment, the processor 124 is configured to receive a third signal 130 from the databases 116 and to send a command to the display unit 120 instructing the display unit 120 to display portions of a corresponding image generated from database or symbols, on a display screen 122. The processor 124 may also be configured to receive a second signal 128 from the aircraft's GNSS/Avionics system 114 to aid displaying data in an iconic format.

The processor 124 is also configured to receive the first signal 126 from the electronic sensor 112 and to send a command to the display unit 120 instructing the display unit 120 to display the EVS image on the display screen 122. The processor 124 is further configured to command the display unit 120 to overlay the synthetic symbol generated from the databases 116 on top of the EVS image, to mark the approach lights.

Figure 2:
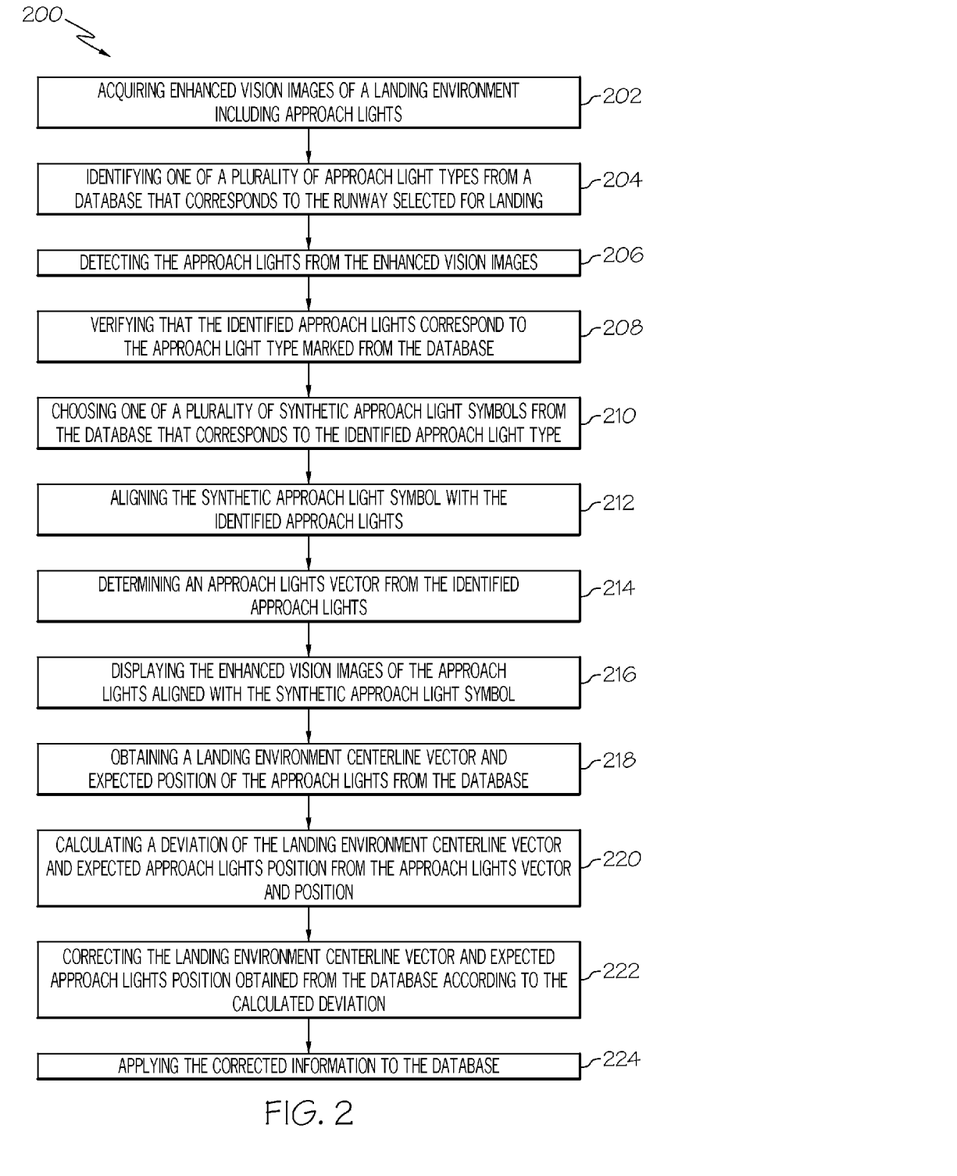
FIG. 2 is a flow chart of a method in accordance with an exemplary embodiment.

FIG. 2 is a flow chart that illustrates an exemplary embodiment of a display process 200 suitable for use with a flight deck display system such as the display unit 120. Process 200 represents one implementation of a method for displaying approach lights on an onboard display element of a host aircraft. The various tasks performed in connection with process 200 may be performed by software, hardware, firmware, or any combination thereof. For illustrative purposes, the following description of process 200 may refer to elements mentioned in FIGS. 3-7. In practice, portions of process 200 may be performed by different elements of the described system, e.g., a processor, a display element, or a data communication component. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein. Moreover, one or more of the tasks shown in FIG. 2 could be omitted from an embodiment of the process 200 as long as the intended overall functionality remains intact.

Figure 3:
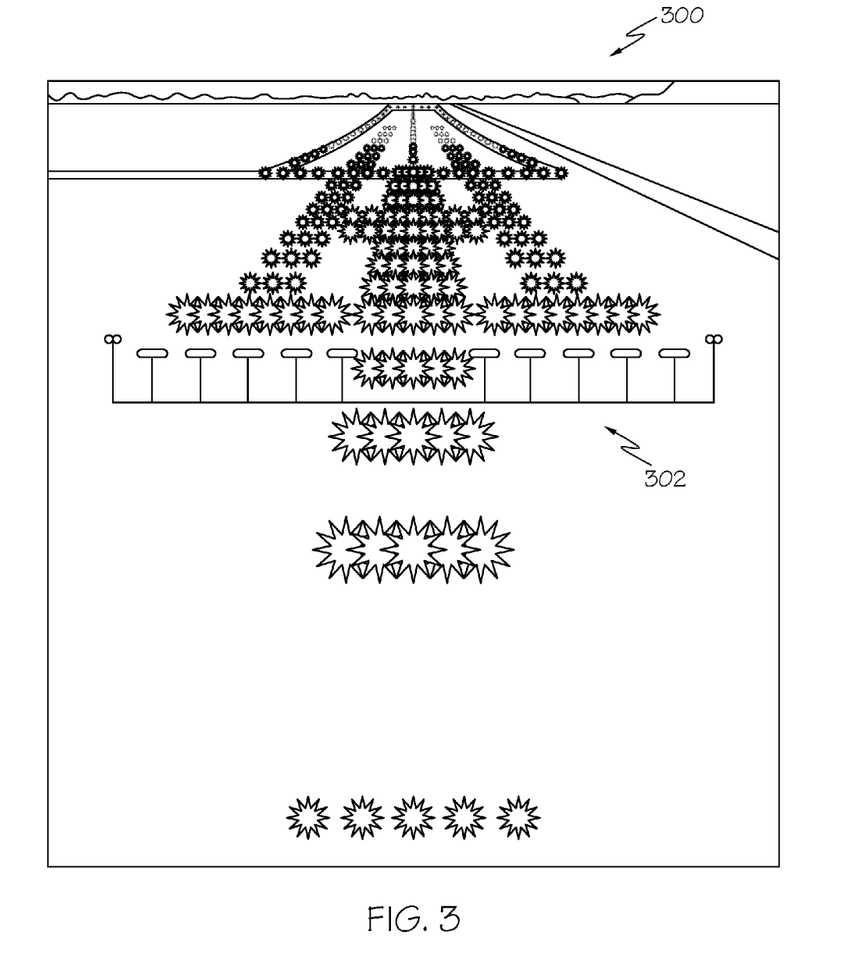
FIG. 3 is an EVS image taken on the approach to a runway, including approach lights.

A description of the method in accordance with an exemplary embodiment will now be made with reference to FIG. 2 and by cross-referencing FIGS. 3-7. EVS images of a landing environment 300 including approach lights 302 as represented by the picture of FIG. 3 are acquired 202. The acquiring of EVS images comprises, for example, the acquiring of infrared images or millimeter-wave images. Optionally, a type of approach lighting system corresponding to the landing runway is identified 204 from a plurality of approach light types stored in a database. When the specific information about the destination runway is available in the database, a specific particular type can be identified. When only partial information about the approach lighting system (ALS) type used is available, only one category, e.g., simple ALS, Cat I ALS, Cat II/III ALS, can be identified. In other embodiments arbitrary group of ALS can be identified. In some embodiments, this step can be omitted and any ALS type can be assumed. While this assumption complicates additional algorithm steps, it is feasible since there are only a limited number of standard ICAO ALS types.

Figure 4:
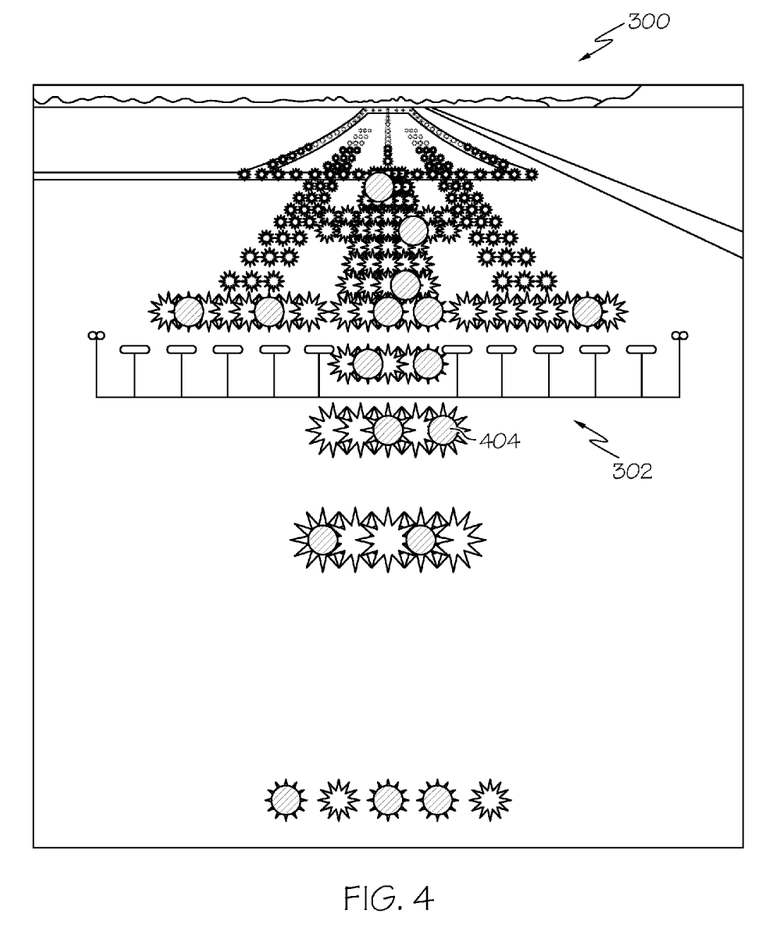
FIG. 4 is the EVS image of FIG. 4 with approach lights marked in accordance with an exemplary embodiment.

The method 200 continues by detecting the approach lights 302 in the EVS image and saving their position in memory 206, 404 for reference as represented by the picture of FIG. 4. Position of the approach lights can mean any relevant position derived from the located approach lights. In one embodiment, the intersection of the main crossbar (as defined by ICAO ANNEX 14—Aerodromes) and the centerline can be used. In another embodiment, the intersection of the approach lights centerline and runway threshold (equivalent to the center of the runway threshold) may be used. In other embodiments, other points whose location can be derived from the approach lights can be used, for example, the center point of the touchdown zone on the runway.

The approach lights detection is performed by computer vision methods. Several methods can be used depending on the situation and information available from databases 116, shown on FIG. 1. Typically, detecting bright objects (lights) by thresholding or adaptive thresholding is used. The Hough transform, a common image processing technique, can be used to identify lines formed by the lights. Image registration can be used to identify flashing lights. Though not all components have to be detected. For example, flashing lights may be omitted. The detected pattern of components (lines, flashing lights, individual lights) is then compared 208 matched to the type of approach lights identified in step 204. The comparison can assess, for example, line lengths, mutual position of the elements, and the number of detected elements. When no particular type has been identified or a group of types has been identified in step 204, all approach lights systems in the group have to be considered and matching with at least one type within the group is required. In some embodiments, elements might not be compared directly. The comparison may be made by matching their characteristic properties. For example, a convex envelope of the ALS may be considered. Some classification approach (e.g. support vector classifier) or signal detection approach (e.g. hypothesis testing) might be used for ALS detection. In some embodiments, not only ALS, but runway threshold lights are detected as an additional line adjacent to the ALS. When the similarity is not established at step 208, the algorithm ends after failing to locate the ALS in the EVS image.

Frequently, in some embodiments, when additional information is available from other sources, such as the GNSS and avionics sensors 114 or the databases 116. This information is used in steps 206 and 208 to simplify the task. For example, precise navigation information and sensor 112 characteristics allow for an accurate pre-selection of a sub area of the EVS image where ALS should be present. The same information also allows for construction of precise models, for example, how the ALS should actually look in the EVS image considering predominately the distance and angle of observation. This allows for a match to the expected model more accurately, possibly allowing even detection 204 and verification 208 by correlation. In other embodiments, equivalent computer vision techniques can be used. In some embodiments detection 204 and verification 208 is aided by some form of frame-to-frame tracking, typically employing some state estimation filter, for example, but not limited to a Kalman filter. When the ALS is located within the image, its location is marked.

Figure 5:
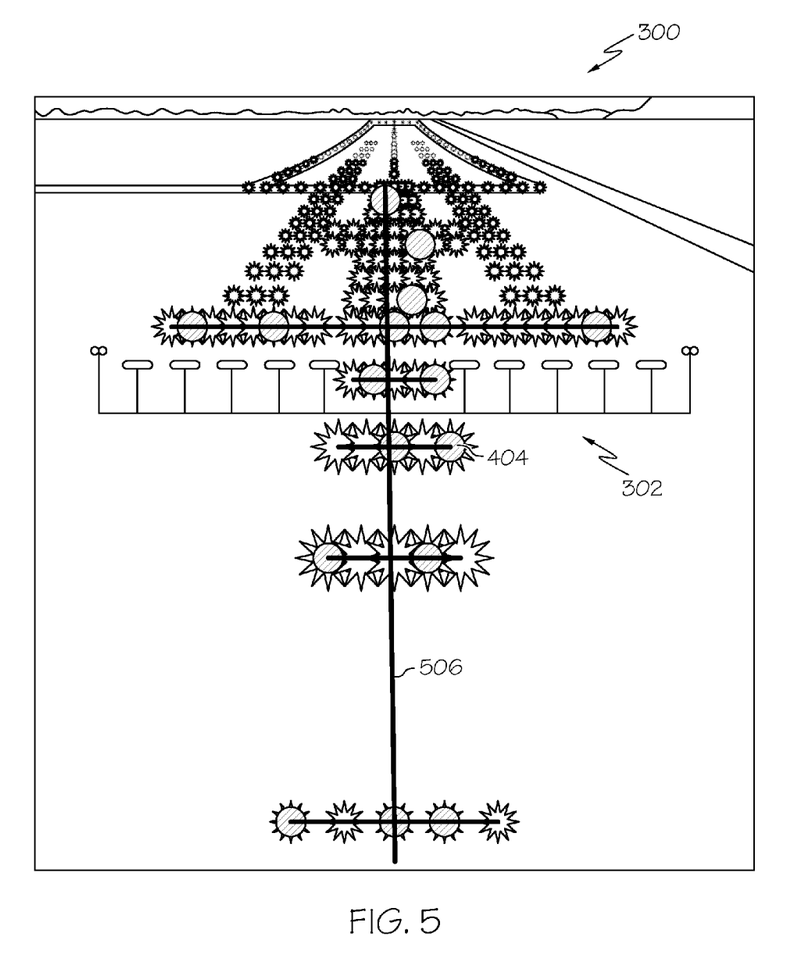
FIG. 5 is the EVS image of FIG. 4 including a synthetic symbol of the approach lights in accordance with the exemplary embodiment.
Figure 6:
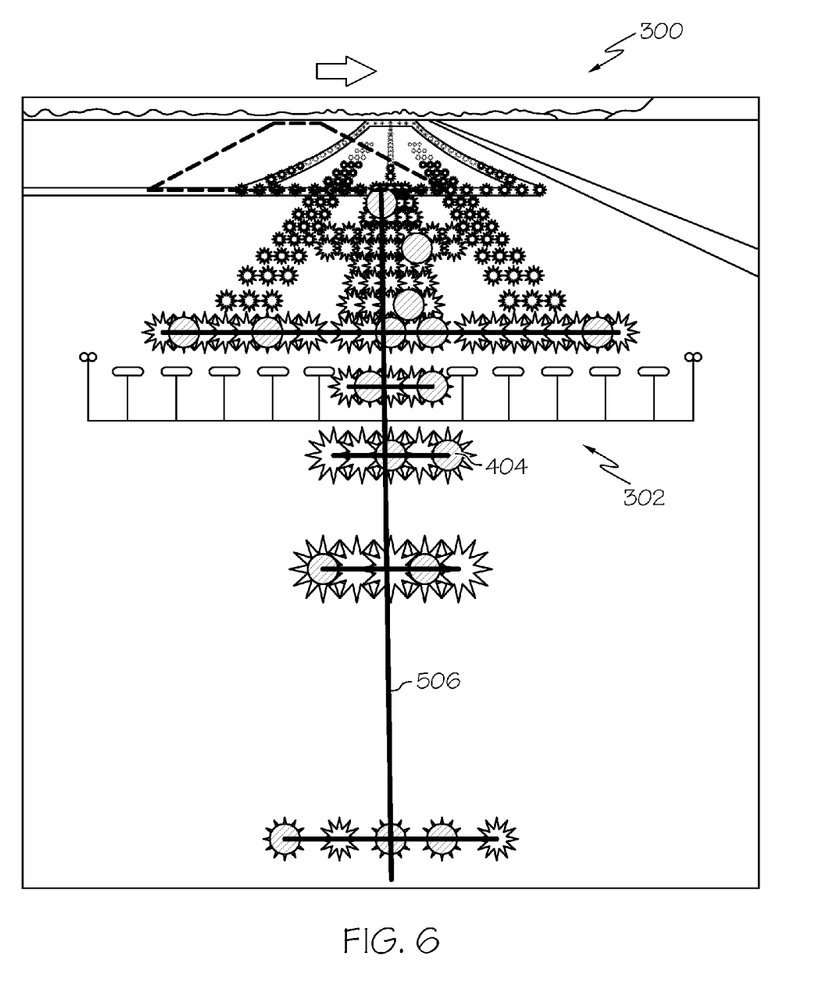
FIG. 6 is the image of FIG. 5 corrected for a calculated deviation.

Examples of the stored approach lights shapes include the standardized International Civil Aviation Organization (ICAO) approach lights, for example but not limited to, Approach Lighting System with Sequenced Flashing Lights (ALSF-1 and -2), Simplified Short Approach Lighting System with Sequenced Flashing Lights (SSALF), Simplified Short Approach Lighting System with Runway Alignment Indicator Lights (SSALR), Medium-intensity Approach Lighting System with Sequenced Flashing lights (MALSF), and Medium-intensity Approach Lighting System (MALSR). When a display is used, one of a plurality of synthetic approach light symbols 506 stored in the database is chosen 210 that it corresponds to the identified approach lights type. The synthetic approach light symbol 506 is aligned 212 with the marked approach lights 404 as represented by the picture of FIG. 5.

Figure 7:
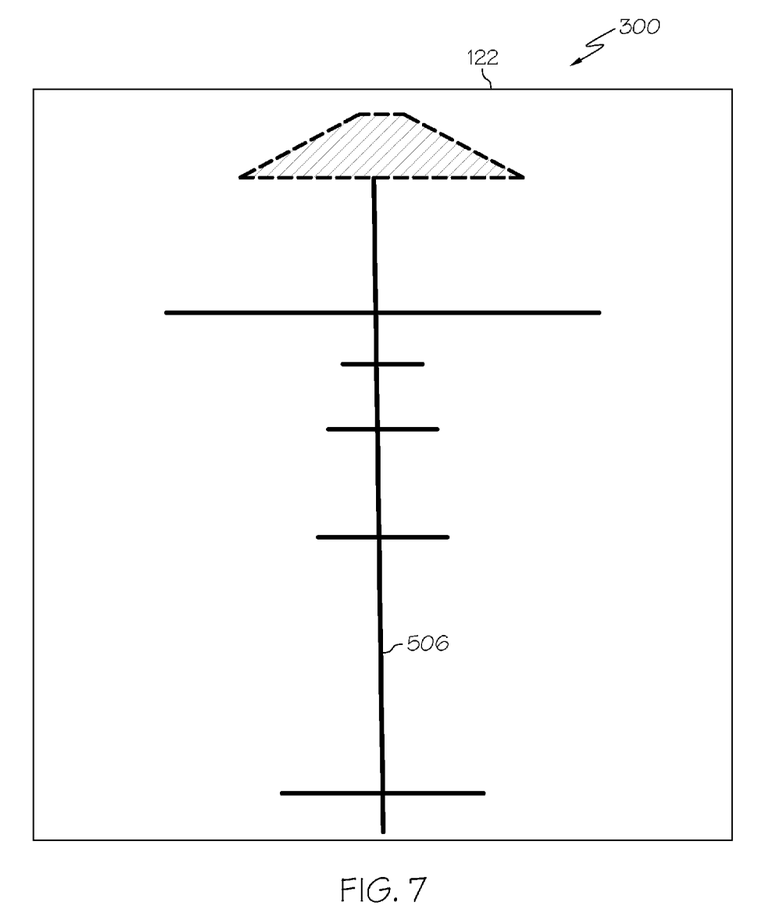
FIG. 7 is the EVS image including a synthetic image of the type of approach lights in accordance with the exemplary embodiment.

An approach lights vector is determined 214 from the identified approach lights and the EVS image of the detected approach lights 302 is displayed 216 in alignment with the synthetic approach light symbol 506 on the display screen 122 (FIG. 7). When the synthetic approach light symbol 506 is not orientation dependent, this step 216 can even precede step 214. Optionally, other steps follow. When an appropriate database is present, a landing environment centerline vector and expected position of the approach lights is obtained 218 from the database. A deviation of the landing environment centerline vector and expected approach lights position from the detected approach lights vector and position is calculated 220. The approach lights vector determines heading (angular) deviation and approach lights position determines shift (metric) deviation. The deviation might be displayed by means of the display to the pilot. The information, for example, the centerline vector and approach lights position, obtained from the database is corrected 222 in accordance with the calculated deviation. In one embodiment, the correction is performed such that the information detected from the EVS image overwrites the information obtained from the database. In some embodiments, the landing environment from the database might not be available and only the environment detected from the EVS image can be used.

When the terrain database is available, the corrected information is applied 224 to the terrain database included among databases 116. An already rendered synthetic image can be shifted and rotated (2D shift and rotation) according to the estimated deviation. Although this approach might work well for small deviations, its performance might be limited for certain deviations or certain types of terrain, showing unreal artifacts in the rendered synthetic image. In such a case, more advanced approach must be used. This approach corrects the entire terrain database and a new synthetic image is rendered from the corrected database. Knowing the 2D deviation in the EVS image and knowing the projection characteristics of the sensor and aircraft state (position with certain precision), a 3D deviation in real world between estimated location of the ALS and detected location can be estimated. For example, common geometric techniques and algorithms, e.g., AbsOr, may be used for this estimation. Typically, some state estimation filter would be used for this task, for example, a Kalman filter. When the 3D deviation is available, it can be used to alter all positions stored in the terrain database. In some embodiments, database corrections may be stored for later evaluation and used to correct systematic inaccuracies in the database.

Figure 8:
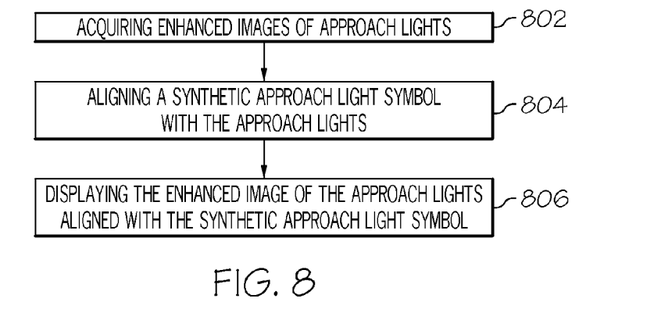
FIG. 8 is a flow chart of a method in accordance with an exemplary embodiment.

In accordance with another exemplary embodiment (FIG. 8), enhanced images including approach lights are acquired 802, a synthetic approach light symbol is aligned 804 with the approach lights and displayed 806.

Figure 9:
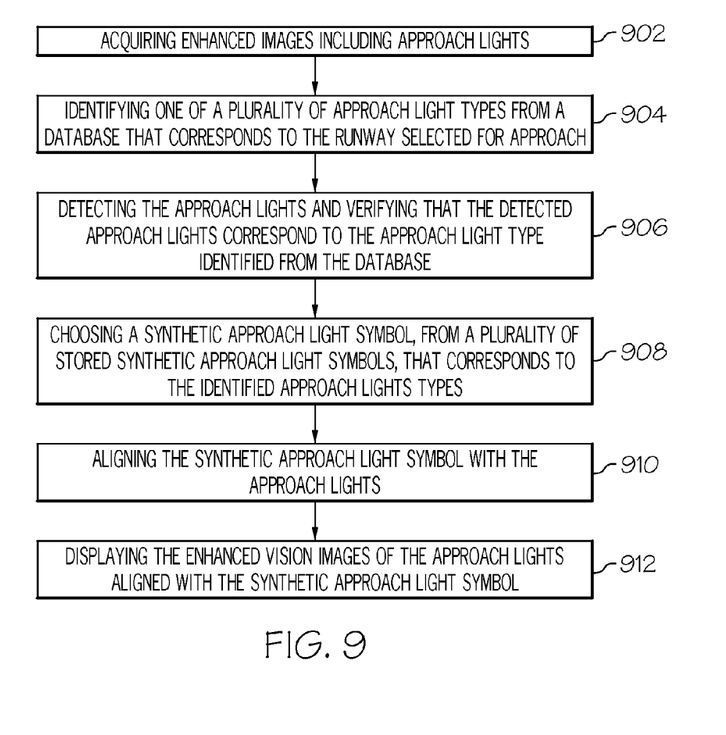
FIG. 9 is a flow chart of a method in accordance with another exemplary embodiment.

In accordance with yet another exemplary embodiment (FIG. 9), images of a landing environment including approach lights are acquired 902. One of a plurality of stored approach light types are identified 904 that correspond to the runway selected for approach; a detection of the approach lights and, subsequently, a verification 906 is made that the approach lights correspond to the approach light type identified from the database. A synthetic approach light symbol is chosen 908 from a plurality of stored synthetic approach light symbols that corresponds to the identified approach light types. The synthetic approach light symbol is aligned 910 with the detected approach lights for display 912.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims.

What is claimed is:

1. A system comprising:
    an electronic sensor configured to acquire an enhanced image including approach lights;
    a display;
    a database configured to store a plurality of approach light types, and one of a plurality of synthetic approach light symbols associated with each of the approach light types; and
    a processor coupled to the sensor and configured to:
        detect approach lights in the image and determine their position within the image;
        determine an expected approach light type from the plurality of approach light types
        compare the detected approach lights with the expected approach light type;
        identifying the synthetic approach light symbol associated with the detected approach light type if it compares favorably with the expect approach light type;
        align the synthetic approach light symbol with the approach lights;
        display on the display the synthetic approach light symbol aligned with an enhanced image of the detected approach lights;
        determine an approach lights vector from the approach lights;
        obtain a landing environment centerline vector and expected approach lights position from the database;
        calculate a deviation of the landing environment centerline vector and expected approach lights position from the detected approach lights vector and position; and
        correct the landing environment centerline vector and expected approach lights position in the database according to the detected deviation.

2. The system of claim 1 wherein the processor is further configured to:
    determine the approach light type as corresponding to a target runway.

3. The system of claim 2 wherein the processor is further configured to:
    verify the identified approach light type matches the detected approach lights.

4. The system of claim 1 wherein the processor is further configured to:
    create the landing environment centerline vector and position based on detected approach lights vector and position.

5. The system of claim 1, wherein the processor is further configured to:
    detect runway threshold lights.

6. The system of claim 1, wherein the system is integrated within an Enhanced Vision System or a Combined Vision System.

7. A system comprising:
    a vision system configured to acquire an image including approach lights;
    a database configured to provide a plurality of approach lights images for expected runways, and a plurality of synthetic approach light symbols, each corresponding to one of the approach light images;
    a display; and
    a processor coupled to the vision system, the database, and the display, and configured to:
        detect the approach lights from the enhanced vision images and store their position in memory;
        identify one of the approach light types that corresponds to the runway selected for landing;
        verify that the identified approach light type matches the detected approach lights;
        choose one of the synthetic approach light symbols that corresponds to the identified approach light type;
        align the synthetic approach light symbol with the approach lights;
        determine an approach lights vector from the approach lights;
        obtain a landing environment centerline vector and approach lights position from the database;
        calculate a deviation of the landing environment centerline vector and expected approach lights position from the approach lights vector and detected approach lights position;
        correct the landing environment centerline vector and expected approach lights position in the database according to the detected deviation;

correct all applicable databases according to the detected deviation; and display the enhanced vision image including the approach lights aligned with the synthetic approach light symbol.

8. A method of displaying images to an aircrew member of an aircraft, comprising:

acquiring enhanced images including approach lights;
detecting the approach lights within the image;
storing the position of the approach lights;
comparing the detected approach lights with an expected approach lights;
aligning a stored synthetic approach light symbol associated with the expected approach lights for an expected runway with the detected approach lights;
displaying on a display the synthetic approach light symbol aligned with the detected approach lights;
determining an approach lights vector from the approach lights;
obtaining a landing environment centerline vector and expected approach lights position from a database;
calculating a deviation of the landing environment centerline vector and expected approach lights position from the detected approach lights vector and position; and
correcting the landing environment centerline vector and expected approach lights position in the database according to the detected deviation.

9. The method of claim 8 further comprising:
identifying one of a plurality of stored approach light types as corresponding to a target runway; and
choosing one of a plurality of stored synthetic approach light symbols that corresponds to the identified approach light types.

10. The method of claim 9 further comprising:
verifying the identified approach light type matches the detected approach lights.

11. The method of claim 8 further comprising:
creating the landing environment centerline vector and position based on detected approach lights vector and position.

12. The method of claim 8 further comprising:
identifying one of the approach light types as corresponding to a target runway based on stored information; and
verifying the identified approach light type matches the detected approach lights.

13. The method of claim 8 further comprising:
detecting runway threshold lights.

14. The method of claim 8 wherein the detecting step comprises:
performing thresholding and Hough transformations.

15. The method of claim 8 wherein the acquiring step comprises:
acquiring a sequence of images, and
the detecting step comprises:
image to image tracking.

* * * * *